3,049,539
INTERMEDIATES AND PROCESSES FOR THE PRODUCTION THEREOF, USED IN THE SYNTHESIS OF ALDOSTERONE
William S. Johnson, Madison, Wis., and William F. Johns, Morton Grove, Ill., assignors to Wisconsin Alumni Research Foundation, Madison, Wis., a corporation of Wisconsin
No Drawing. Filed July 29, 1957, Ser. No. 674,565
25 Claims. (Cl. 260—239.55)

The present invention relates to the steroid field and in particular to non-aromatic steriods in which ring C is oxygenated to intermediates therefor, and to methods of synthesis thereof.

The basic intermediate is the dihydroxy ketone $3\alpha,11\beta$-dihydroxy-D-homo-18-noretiocholan-17a-one (I), disclosed in the copending application of Johnson et al., Ser. No. 511,397, now Patent No. 2,847,457, filed May 26, 1955. The furfurylidene derivative (II) M.P. 189–191° was prepared in 96% yield from the pure dihydroxy ketone M.P. 175–179°, or in about 86.5% yield from less pure material M.P. 169–175°. The pure furfurylidene ketone (II) melted at 193–194°.

The reaction of the furfurylidene ketone (II) with acrylonitrile can be run without protecting the two hydroxyl groups present in the molecule. Initial attempts indicated that if the acrylonitrile were added to a basic methanol solution of the compound, the reaction would proceed to a large extent in a short time at 0°, but then would proceed much more slowly. This procedure at room temperature produced much O-alkylated material. A modified and successfully employed procedure entailed formation of $\beta$-methoxy-proprionitrile before addition of the tetracyclic ketone, the rate of alkylation being governed by the rate of dissociation of the nitrile. Using acrylonitrile directly at room temperature, the best yield of the adduct (IIIa) obtained was 40.1%, M.P. 186–189. The modified procedure, using 50 equivalents of methanol and heating the reaction at reflux, provided 62.6% of the cis-adduct (IIIa), M.P. 183–187°. The higher yield in the latter case is probably due to a more rapid reversal of O-alkylation than in the former experiment because of the temperature difference. The pure adduct had M.P. 192–193°; $\lambda$ max 329.8 m$\mu$.

The diacetate of the Michael adduct (IIIc) was treated with excess ozone in an inert solvent, e.g. ethyl acetate, at $-70°$, and the resulting ozonide was cleaved with hydrogen peroxide to afford the diacid IV, M.P. 201–204°. On heating the entire crude mixture in 10% aqueous potassium hydroxide at 100° for 20 hours followed by acidification, 57% of the lactone V, M.P. 264–266° ($\lambda$ max 5.70$\mu$) was obtained.

Sodium borohydride reduction of the Michael adduct (IIIa) was followed by its ultraviolet spectrum. When the furfurylidene ketone absorption had disappeared, the product was chromatogrammed yielding a crystalline triol VIb in 56% yield, M.P. 192–194° (analytical M.P. 200.0–200.5°). The remainder presumably was a mixture of the crystalline and non-crystalline epimers about $C_{17a}$. Acetylation with i-propenyl acetate yielded after chromatography the triacetate (VIa), M.P. 200–204°.

An alternative route to the triacetate (VIa) involved sodium borohydride reduction of the diacetoxy ketone (IIIc). This assured retention of the 11-acetate and allowed milder acetylation conditions to be used in esterification of $C_3$ and $C_{17a}$-hydroxyl groups. The crude borohydride product was acetylated with pyridine-acetic anhydride for a short time at 100°, giving the triacetate.

Pyridine-acetic anhydride treatment of the triol VIb gave mostly an amorphous 3,17a-diacetate VIc along with small amounts of the crystalline triacetate VIa. The basis for this assignment of structure to the non-crystalline portion was the known ease of acetylation of both the $C_3$ and $C_{17a}$-hydroxyl groups.

Ozonolysis of the triacetate VIa was followed by reductive decomposition of the ozonide and chromatography of the product. This afforded the triacetoxy ketone VIIb, M.P. 135–140°.

Ozonolysis of the Michael adduct IIIa followed by an appropriate reduction leads to the tetrol nitrile (XI). The Michael adduct in methanol at $-70°$ was treated with excess ozone and then reduced immediately with sodium borohydride. The reduction was shown by infrared spectroscopy to be substantially complete after a day at 0°. (Warmer temperatures were found to cause partial reduction of the nitrile.) A weak band at 5.9$\mu$ persisted, probably representing some $C_{11}$ ketone; ozone is known to oxidize hydroxyl groups slowly, and, whereas the $C_3$-ketone would be rapidly reduced to the $C_3$ $\alpha$-hydroxyl by borohydride, the $C_{11}$ carbonyl is known to be attacked only very slowly by this reagent. The tetrol was chromatogrammed on activated magnesium silicate (Florisil). A portion of the tetrol (XI) crystallized as a monohydrate, M.P. 137–140°.

Treatment of XI with a slight excess of sodium metaperiodate at room temperature overnight gave a 70.4% yield of non-crystalline, neutral material; the remainder was probably lost through oxidation of the primary aldehyde to a carboxyl group. The neutral product (XII) was treated with methanolic acid to form the more stable acetal, and the product was chromatogrammed on Florisil. It was found to contain large amounts of the lactone XIV as shown by an intense 5.70$\mu$ band in the spectrum of 65% of the material. The source of the lactone was undoubtedly due to oxidation of the intermediate lactol XIIIa. It has been shown by Mosher and Preiss, J. Am. Chem. Soc., 76, 5605 (1953), that oxidation of aldehydes to acids goes much faster if an intermediate hemi-acetal can form; in this case the tertiary aldehyde can readily form such a hemi-acetal with the $C_{11}$ $\beta$-hydroxy group and thus becomes more susceptible to oxidation than would be the primary aldehyde.

In other runs, one equivalent of sodium metaperiodate was used and the temperature and length of time were cut considerably to 0° for 10 minutes. The product, even when crystalline tetrol XI was used, failed to crystallize, although it had the proper spectral characteristics. The acetal was again formed with methanol containing p-toluenesulfonic acid and the product was chromatogrammed. Separation of the desired acetal lactol ether XIIIa from accompanying materials was easily accomplished in this way, and gave from 70–95% of substantially pure acetal as shown by subsequent isolation in high yield of the crystalline 3-acetate. The remainder of the material was eluted much later from the column and consisted partly of the lactone acetal XIV.

Acetylation of the hydroxy acetal XIIIa gave a crystalline monoacetate XIIIb. The acetylation was first accomplished using the sodium hydride-phenyl acetate method and later with the somewhat simpler pyridine-acetic anhydride method. The former after 2 hours at room temperature gave an 83.6% yield, M.P. at least 100–110° (pure sample: M.P. 112–114°). Later samples crystallized in a polymorphic form, M.P. 126–127°. Pyridine-acetic anhydride gave 93.6%, M.P. at least 118–124°, when used directly on chromatographed material. It was of importance to determine in this compound and its precursor if the tertiary aldehyde had formed an acetal (leaving the $C_{11}$ hydroxyl bare or possibly acetylated) or if it had been converted to the lactol methyl ether (as shown in XIII). A methoxyl determination showed clearly that three methoxyl groups were present, and thus the molecule had the lactol ether structure XIII.

To introduce a double bond adjacent to the terminal carbon of the nitrile side chain, the next route tried involved the initial steps of the Barbier-Wieland degradation sequence. Saponification of the acetal nitrile XIII*b* with aqueous potassium hydroxide was followed by esterification with diazomethane. The amorphous acetal ester XV was treated with phenyllithium in ether at room temperature for 2 hours, affording a crystalline diphenyl carbinol XVI*a* (solvated with acetone) in 63% yield (from the nitrile XIII*b*), M.P. 100–102° (when pure: M.P. 101–103°). The carbon-hydrogen analysis and the infrared spectrum ($\lambda$ max 5.86$\mu$) confirmed the existence of a mole-equivalent of acetone present in the crystals; an amorphous sample showed no carbonyl absorption in the infrared. Methoxyl determination showed readily that the compound had three methoxyl groups which had survived the action of phenyllithium.

A fresh sample of the diphenyl carbinol XVI*b* was allowed to stand with thionyl chloride-pyridine in benzene for 15 minutes at 0°. On heating the product in pyridine at 100° for 15 minutes, the absorption in the ultraviolet increased greatly ($\lambda$ max 251 m$\mu$, log E 4.18). Chromatography provided the crystalline styrene XVII*b*, M.P. at least 148–155°, in 88% yield. The pure material was obtained by recrystallization from methanol: M.P. 159–160°; ($\lambda$ max 250.5 m$\mu$, log E 4.20).

Early attempts to selectively hydrolyse the acetal nitrile XIII*b* employed aqueous methanol containing p-toluene-sulfonic acid, but the reaction was very slow. A marked improvement was seen when 70% aqueous acetic acid was used. After a number of experiments, the optimum conditions (16 hours at room temperature) were found whereby there was obtained by direct crystallization of the mono-aldehyde XVIII, M.P. 83–85° (solvated with a mole-equivalent of ether). Similar conditions were applied to the phenyl styrene XVII to obtain the mono-aldehyde XIX.

A route employing the readily obtained mono-aldehyde nitrile XVIII, was investigated. This involved initial degradation of the propionaldehyde side chain, followed by use of the Barbier-Wieland degradation.

The enamine derivative XX of the mono-aldehyde XVIII was formed in high yield as evidenced by the ultraviolet spectrum ($\lambda$ max 235 m$\mu$, log E 3.84) but the product failed to crystallize. The amorphous enamine XX was ozonized in methylene dichloride containing pyridine followed by reductive decomposition of the ozonide using zinc and aqueous acetic acid. Direct crystallization of the aldehyde XXI failed, and so it was chromatographed on Florisil. This afforded 45% of material which was shown to be essentially pure aldehyde by conversion to the crystalline acetal (see below).

The crude aldehyde fractions were treated with methanol containing p-toluenesulfonic acid to form the acetal lactol ether. After chromatography, 75.6% of a crystalline acetate XXII, M.P. at least 149–152°, was isolated. Recrystallization from ether gave the pure substance, M.P. 150–152°.

Saponification of the nitrile group in the noracetal XXII followed by esterification with diazomethane and chromatography of the product gave an amorphous ester XXIII in essentially quantitative yield. Treatment of this material with phenyllithium in ether at room temperature for 2 hours gave a crystalline diphenyl carbinol XXIV*a*, M.P. 116–119°. The 3-hydroxyl group was esterified in the usual way to give an amorphous acetate XXIV*b* and was followed by dehydration according to the procedure described above, affording an amorphous phenyl styrene XXV. The high intensity of absorption in the ultraviolet spectrum ($\lambda$ max 251 m$\mu$, log E 4.24) indicated that the reaction had proceeded in good yield.

Ozonization of the phenyl styrene XXV was carried out in methylene chloride containing pyridine at −70°, and the ozonide was decomposed with zinc and acetic acid. Direct crystallization of the product failed, so it was chromatogrammed on Florisil. The aldehyde XXVI was obtained as an amorphous solid ($\lambda$ max 3.70$\mu$) in fractions amounting to 65% of the product.

The chromatographically pure aldehyde XXVI was treated with 70% acetic acid at room temperature to selectively hydrolyze the primary acetal. Evidence that hydrolysis of both acetal groups had occurred to give the dialdehyde XXVII was shown by the presence of a hydroxyl band at 2.90$\mu$ and the lack of the bands at 9.0$\mu$ characteristic of the lactol ether.

The dialdehyde XXVII was cyclized in benzene solution containing piperidene and acetic acid as catalysts. After 2 hours the product XXVIII showed a maximum in the ultraviolet at 239 m$\mu$, (literature value for 1-cyclopentenaldehyde: $\lambda$ max 237 m$\mu$, log E 4.08).

EXAMPLE I

3$\alpha$,11$\beta$-Dihydroxy-D-Homo-18-Noretiocholan-17-Furfurylidene-17a-One (II)

In 1.0 l. of methanol (purified by distillation from potassium hydroxide) was dissolved 27.02 g. of 3$\alpha$,11$\beta$-dihydroxy-D-homo-18-noretiocholan-17a-one (I) M.P. 169–173°. The solution was cooled to 5°, and 54 ml. of freshly distilled furfural was added. The air in the flask was replaced by nitrogen, 400 ml. of 15% aqueous potassium hydroxide was added and the flask was sealed tightly. The solution was allowed to stand at room temperature overnight. The precipitate, which formed was collected on a filter, washed generously with water, and was dried to constant weight in vacuo, yielding 28.45 g. of the furfurylidene derivative (II), M.P. 191–194°. A second crop was obtained from the mother liquors, M.P. 193–194°. A pure sample was obtained from another run by repeated recrystallization from methanol and from acetone-petroleum ether, as colorless lustrous plates, M.P. 193–194°; $\lambda$ max 324 m$\mu$ (log E 4.36).

*Analysis.*—Calcd. for $C_{24}H_{32}O_4$: C, 74.96; H, 8.39. Found: C, 73.49; H, 8.71. Calcd. for $C_{24}H_{32}O_4 \cdot \frac{1}{2}H_2O$: C, 73.25; H, 8.45.

EXAMPLE II

3$\alpha$,11$\beta$ - dihydroxy - 13$\alpha$ - (2 - Cyanoethyl) - D - Homo-18-Noretiocholan-17-Furfurylidene-17a-One (IIIa)

(a) *Using $\beta$-methoxyproprionitrile.*—A solution of 48 mg. of sodium hydride in 6 ml. of anhydrous methanol was cooled to 5°, and to it was added slowly 1.20 ml. of acrylonitrile (B.P. 75–78°). The solution was allowed to stand at room temperature for an hour and then cooled again to 5°. The furfurylidene ketone (II) (1.15 g.) M.P. 191–194°, was added, and the solution was stirred at room temperature for two hours and then heated at reflux for two hours. The reaction had proceeded very little as was shown by the amount of material which had not dissolved. Upon addition of 4 ml. of pure tetrahydrofuran the crystals immediately dissolved. After a total of 8 hours of heating at reflux, an ultraviolet spectrum of a portion of the homogeneous reaction mixture exhibited a maximum at 329.7 m$\mu$. The mixture was cooled to 5°, and acetic acid was added until the solution was acidic. It was then diluted with water and extracted with ethyl acetate. The extract was washed with aqueous sodium bicarbonate and water, dried over magnesium sulfate, and distilled to dryness under reduced pressure, the final portions of $\beta$-methoxyproprionitrile being distilled at 1.0 mm. and 100°. The product was crystallized from a small volume of acetone, and the crystals were washed with hot petroleum ether and then ether. This gave 750 mg. of crystals, M.P. 183–187°; a second crop, M.P. 170–180°, was recrystallized from acetone to yield additional good material, M.P. 185–188°. Repeated recrystallization from methanol of a sample from another run gave colorless plates, M.P. 193–194°; $\lambda$ max 329.8 m$\mu$ (log E 4.32); $\lambda$ max 2.85 (OH; ms), 4.47 (CN; mw), 6.07 (conj. CO; ms), 6.35$\mu$ (aromatic; s).

*Analysis.*—Calcd. for $C_{27}H_{35}O_4N$: C, 74.11; H, 8.06; N, 3.20. Found: C, 74.22; H, 8.04; N, 3.14.

(b) *Using acrylonitrile directly.*—To a solution of 120 mg. of sodium hydride in 4.0 ml. of anhydrous methanol was added 3.84 g. of the furfurylidene ketone (II) M.P. 191–194°, and 5.0 ml. of pure tetrahydrofuran. The mixture was cooled to 5°, and 4.0 ml. of acrylontrile was added dropwise. After 15 minutes at 0°, the maximum was 328.6 mµ, but neither after an hour at 0° nor an hour at room temperature was any shift in the maximum seen. On heating for two minutes, the solution became homogeneous and was allowed to stand at room temperature an additional hour. The spectrum now showed a maximum at 329.4 mµ. The reaction was worked up as in the above experiment (a), yielding 1.75 g., M.P. 186–189°. The second crop had a M.P. 176–183°.

EXAMPLE III

*3α,11β - Dihydroxy - 13α - (2 - Cyanoethyl) - D - Homo-18-Noretiocholan-17-Furfurylidene-17a-one Diacetate (IIIc)*

A solution of 290 mg. of the Michael adduct (IIIa) M.P. 187–190°, in 20 ml. of i-propenyl acetate (redistilled) containing 130 mg. of p-toluenesulfonic acid monohydrate was allowed to stand at room temperature overnight. Aqueous sodium bicarbonate was added, and the mixture was extracted with ethyl acetate-ether. After drying the organic layer over magnesium sulfate, the solvent was removed under reduced pressure. The residue crystallized from methanol, affording 295 mg. of the diacetate (IIIc) M.P. 226–230°. A second crop of crystals melted at 207–219°. Several recrystallizations of a portion of the first crop from acetone and from ethyl acetate gave a pure sample as colorless fine needles, M.P. 236.0–236.5°; λ max 333.0 (log E 4.42).

*Analysis.*—Calcd. for $C_{31}H_{39}O_6N$: C, 71.37; H, 7.54. Found: C, 71.09; H, 7.38.

To determine the ease of acetylating the $C_{11}$ hydroxyl, 12 mg. of the Michael adduct (IIIa) M.P. 187–190°, in 2 ml. of pyridine and 1 ml. of acetic anhydride was heated at 100° for 30 minutes. A work up similar to that above gave 8 mg. of crystals, M.P. 174–177°, from methanol; λ max 329.7 mµ; λ max 2.85 (OH; m), 4.46 (w), 5.88 (OAc; s), 6.05 (conj. CO; ms), 6.35µ (aromatic; s). This was the 3α-monoacetate (IIIb).

EXAMPLE IV

*4b - Methyl - 1β,2α - di-(2 - carboxyethyl) - 2β - Carboxy - 4β,7α - Dihydroxyperhydrophenanthrene - 2β, 4β-Lactone (V)*

Through a solution of 45 mg. of the diacetate (IIIc) M.P. 228–231°, in 40 ml. of ethyl acetate at −70° was passed a stream of oxygen containing ozone until the solution turned pale blue. To the stirred solution was added 20 ml. of 3% aqueous sodium bicarbonate, 0.1 ml. of 30% aqueous hydrogen peroxide, and 5 ml. of methanol. The mixture was allowed to come to room temperature and was stirred at that temperature for 4 hours. The methanol was then removed under reduced pressure, and the mixture was extracted with benzene. Solid potassium hydroxide was added to the aqueous layer until it was 10% in potassium hydroxide, and the solution was heated at 100° for 35 hours. After cooling, the mixture was again extracted with benzene, and the aqueous layer was acidified and extracted with ethyl acetate. The ethyl acetate solution was dried over magnesium sulfate, and the organic solvent was removed under diminished pressure. From 50 mg. of residue there was obtained 20 mg. of the lactone (V) M.P. 267–269°, from acetone-petroleum ether. A second crop gave lower melting material. Pure (V) M.P. 268–269° (colorless prisms), was obtained by two recrystallizations from methyl ethyl ketone; λ max 2.90 (OH; ms), 5.70 (γ-lactone; s), 5.90µ ($CO_2H$; s).

*Analysis.*—Calcd. for $C_{22}H_{37}O_7$: C, 64.68; H, 7.90. Found: C, 64.53; H, 7.91.

EXAMPLE V

*4b - Methyl - 1β - (2 - Carboxyethyl) - 2β - Carboxy - 2-(2 - Cyanoethyl) - 4β,7α - Dihydroxyperhydrophenanthrene 4β,7α-Diacetate (IV), and Conversion to Lactone (V)*

In another run, after treatment of 90 mg. of the diacetate (IIIc), M.P. 228–232°, with ozone and hydrogen peroxide as described above (using proportional amounts of reagents and solvents), there was obtained 65 mg. of 4b-methyl - 1β - (2 - carboxyethyl) - 2β - carboxy - 2 - (2-cyanoethyl)-4 β,7α-dihydroxyperhydrophenanthrene 4β, 7α-diacetate (IV), M.P. 201–204°, from ethyl acetate. Repeated recrystallization from ethyl acetate afforded colorless prisms, M.P. 209–210°.

*Analysis.*—Calcd. for $C_{26}H_{37}O_8N$: C, 63.52; H, 7.48. Found: C, 63.45; H, 7.59.

Ammonolysis of the two acetate groups of the diacid (IV) was attempted using anhydrous methanol saturated with ammonia at room temperature for 24 hours. The product obtained from 50 mg., M.P. 201–204°, of the diacid (IV), had a wide melting range (150–180°) which did not sharpen on recrystallization. The mixture was recombined in 10 ml. of anhydrous methanol to which 50 mg. of sodium hydride had been added. This was heated at reflux under nitrogen for 5 hours. The solution was cooled, and water was added. The solution was made 10% in aqueous potassium hydroxide and was heated at 100° for 20 hours. Acidification followed by an extraction with ethyl acetate as above afforded 14 mg. of the lactone (V) M.P. 264–266°. Mixed melting point determination and comparison of the infrared spectra of this material with that obtained above showed them to be the same.

EXAMPLE VI

*3α,11β,17a-Trihydroxy-13α-(2-Cyanoethyl)-17-Furfurylidene-D-Homo-18-Noretiocholane (VIb)*

A solution of 1.750 g. of the dihydroxy ketone (IIIa) M.P. 186–189°, in 230 ml. of methanol containing 16 ml. of water was cooled to 0° and to this was added 1.5 g. of sodium borohydride. The mixture was stirred at −10° for 60 hours before an ultraviolet spectrum showed the complete disappearance of the furfurylidene ketone chromophore (λ max 330 mµ). Excess acetic acid was added slowly, and the methanol was removed under reduced pressure. The product was extracted with ethyl acetate, washed with water and aqueous sodium bicarbonate, dried over magnesium sulfate, and concentrated to dryness in vacuo, yielding 1.850 g. of a non-crystalline material. Chromatography of 525 mg. of this product on 20 g. of Florisil (activated magnesium silicate) gave by elution with 10 to 50% ethyl acetate in benzene 445 mg. of crystalline material melting over a wide range (150–180°) and presumably representing a mixture of epimeric alcohols about $C_{17a}$. From the combined fractions a first crop of 230 mg. of the triol (VIb), M.P. 192–194°, and a second crop, M.P. 189–193°, was obtained from acetone. Repeated recrystallization of this material from acetone gave a sample, M.P. 200.0–200.5°, as fine colorless rods; λ max 262 (log E 4.30), 269 (4.32), 281 (4.18); λ min 264 (4.29), 278 mµ (4.14).

*Analysis.*—Calcd. for $C_{27}H_{37}O_4N$: C, 73.77; H, 8.48. Found: C, 73.39; H, 8.28.

EXAMPLE VII (a) *3α,11β,17a-trihydroxy-13α-(2-cyanoethyl)-17-furfurylidene-D-homo-18-noretiocholane-triacetate (VIa).*—To 805 mg. of the crude triol (VIb) mixture (as obtained directly from the borohydride reaction mixture) in 40 ml. of i-propenyl acetate (redistilled) was added 130 mg. of p-toluenesulfonic acid monohydrate, and the solution was allowed to stand at room temperature for 17 hours. Ethyl acetate and aqueous sodium bicarbonate were added to the black reaction mixture. The extract was washed with water, dried over magnesium sulfate, and evaporated under reduced pressure. The product was chromatogrammed on 40 g. of Florisil, but only 100 mg. of the triacetate (VIa), M.P. 200–204°, and 85 mg. of oil accompanying it (and eluted with ether) had the proper ultraviolet spectrum. Recrystallization of the crystalline material from acetone or from methanol gave crystals, M.P. 205–208°. However, if the material was allowed to crystallize very slowly from acetone-petroleum ether, the melting point was 209–242°; on recrystallizing this material more quickly the melting point returned to 204–206°. This indicates the existence of a higher melting polymorphic form which cannot be readily obtained.

(b) *Reduction and acetylation of the diacetoxy ketone (IIIc).*—To 205 mg. of the diacetate (IIIc), M.P. 226–230°, in 95 ml. of methanol at 0° was added a solution of 1.60 g. of sodium borohydride in 9 ml. of water. After 40 hours much starting material was still out of solution. Tetrahydrofuran (40 ml.) and 1.4 g. of sodium borohydride was added, and stirring was continued at 0° for 30 hours. The ultraviolet spectrum showed the reduction to be complete (no maximum at 333 m$\mu$). Acetic acid was added dropwise until the solution was no longer basic. The methanol was distilled off under reduced pressure, water was added, and the mixture was extracted with ethyl acetate. The extract was washed with aqueous sodium bicarbonate, dried over magnesium sulfate, and evaporated to dryness under reduced pressure, providing 210 mg. of amorphous material.

A solution of the product in 5 ml. of pyridine and 2.5 ml. of acetic anhydride was allowed to stand at room temperature overnight. The solution was poured on iced aqueous sodium bicarbonate and was then extracted with ethyl acetate. The dried extract was concentrated in vacuo and chromatogrammed on 8 g. of Florisil. Crude triacetate fractions eluted with ether weighed 145 mg. ($\lambda$ max 5.82$\mu$ (OAc); no hydroxyl bands appeared) and afforded from a small volume of acetone a total of 32 mg. of triacetate, M.P. 187–198°. Recrystallization gave a sample, M.P. 202–204°, which gave no depression in melting point on admixture with the authentic triacetate (VIa).

EXAMPLE VIII

*3α,11β,17α-Trihydroxy-13α-(2-Cyanoethyl)-D-Homo-18-Noretiocholan-17-Furfurylidene 3α,17α-Diacetate (VIc) Pyridine-Acetic Anhydride Acetylation*

A solution of 65 mg. of the triol (VIb), M.P. 189–193°, in 0.2 ml. of pyridine and 0.05 ml. of acetic anhydride was allowed to stand at room temperature for 16 hours. There was little darkening of the solution visible during this time. An ether extraction was made of the product and afforded 75 mg. of amorphous material which failed to crystallize. The product was carefully chromatogrammed on 6 g. of Florisil, but the only crystalline material which could be obtained (eluted with 1:1 ether-petroleum ether) was 3 mg. of the triacetate (VIa), M.P. 197–200°. This gave no depression on admixture with an authentic sample of the triacetate. An infrared spectrum of the non-crystalline residue, showed both hydroxyl and acetate bands (2.87, 5.82$\mu$).

In another run, 190 mg. of the triol, M.P. 192–194°, was treated in 1 ml. of pyridine containing 0.5 ml. of acetic anhydride at 100° for 8 minutes. The solution was cooled and worked up as above. The product was carefully chromatogrammed on 6 g. of Florisil. Each of the fractions (eluted between benzene and ether) produced a small amount of crystalline material which showed no hydroxyl bands in the infrared. Combination of the crystalline material and recrystallization from methanol gave 25 mg., M.P. 187–195°, of the diacetate (VIc) as shown by further purification and a mixture melting point with an authentic sample.

EXAMPLE IX (a) *3α,11β - 17α - trihydroxy-13α-(2-cyanoethyl)-D-homo-18-norethiocholan-17-one triacetate (VIIb).*—A solution of 100 mg. of the triacetate (VIa), M.P. 200–204°, in 15 ml. of ethyl acetate at −70° was treated with a stream of oxygen containing excess ozone until the solution turned a pale blue color. To the solution was immediately added 0.2 g. of 6% palladium-on-strontium carbonate and this was shaken in an atmosphere of hydrogen at 40 p.s.i. at room temperature for 30 minutes. The solution gave a negative starch-iodide test and was filtered. An ultraviolet spectrum showed the absence of any furfurylidene grouping (no maximum at 276 m$\mu$). The solvent was removed under reduced pressure and the product was chromatogrammed on 8 g. of Florisil. The first band of material, eluted with ether, consisted of 46 mg. of the product, and showed in the infrared sharp absorption at 5.81$\mu$; the ultraviolet showed an intense maximum at 224 and a lesser one at 274 m$\mu$. Eluted with 10% ethyl acetate in ether was 32 mg. of product (VIIb) which crystallized from methanol affording 20 mg., M.P. 135–140°. Recrystallization from methanol gave 12 mg., M.P. 138–145° (colorless irregular prisms). A final 9 mg. of lower melting material (M.P. 100–130°) was eluted with acetone.

In another run, starting with 150 mg. of amorphous triacetate (the non-crystalline residue after removal of crystalline epimer) after ozonolysis and chromatography as in the preceeding paragraph, semi-crystalline fractions totalling 80 mg. (eluted with 10% ethyl acetate in ether) were obtained. These were combined and crystallized from methanol, giving 23 mg. of the product (VIIb), M.P. 144–149°. A mixed melting point with the material obtained above gave no depression. Recrystallization from methanol gave 19 mg., M.P. 151–170°.

EXAMPLE X

*3α,11β-Dihydroxy-13α-(2-Cyanoethyl)-D-Homo-18-Noretiocholan-17,17a-Dione (IX)*

A solution of 530 mg. of the diacetate (IIIc) M.P. 229–233°, in 45 ml. of ethyl acetate was cooled to −70°, and a stream of oxygen containing ozone was passed through until the solution turned a faint blue color. To the solution was added 500 mg. of pulverized 6% palladium-on-strontium carbonate, and the mixture was shaken in an atmosphere of hydrogen at 40 p.s.i. at room temperature. After 15 minutes, the material gave a negative starch-iodide test, indicating reduction of the ozonide was complete. The solution was filtered, washed with 5% aqueous potassium bicarbonate, and with water, dried over sodium sulfate, and concentrated to dryness in vacuo affording 496 mg. of an ether insoluble oil. The material first obtained was fairly soluble in petroleum ether, but its solubility seemed to change on standing, possibly due to a tautomeric shift of the diketone.

EXAMPLE XI

*Preparation of Enolate Derivatives of the Diketone (IX)*

(a) *Reaction with diazomethane.*—A solution of 240 mg. of the amorphous diketone (IX) was dissolved in 10 ml. of methanol and excess diazomethane (ca. 5 millimoles) was added in 30 ml. of ether. After 10 minutes at room temperature, the solvent was evaporated in a stream of air. On dissolving the residue in acetone a slow evolution of gas was observed. A compound of unknown structure was initially amorphous, but it crystallized after standing for a month. Recrystallization from aqueous methanol gave 52 mg. of the 17-methyl enolate (X), M.P. 140–141°. Repeated recrystallization from petroleum ether gave a sample, M.P. 143–144°, as colorless fine needles; $\lambda$max 4.46 (CN; m), 5.82 (CO; s); only weak end absorption appeared in the ultraviolet spectrum.

*Analysis.*—Calcd. for $C_{28}H_{39}O_6N_3$: C, 65.47; H, 7.65; N, 8.76. Found: C, 64.97; H, 7.69; N, 2.85.

EXAMPLE XII

*3α,11β,17,17α-Tetrahydroxy - 13α - (2-Cyanoethyl)-D-Homo-18-Norethiocholane (XI)*

A solution of 1.02 g. of the Michael adduct (IIIa) M.P. 187–190°, in 60 ml. of methanol and 5 ml. of pyridine was cooled to −70°, and a stream of oxygen containing ozone was passed through until the solution turned a faint blue color (25 minutes). The solution was quickly put under reduced pressure to remove any dissolved ozone, and after 3 minutes a solution of 1.0 g. of sodium borohydride in 10 ml. of water was added slowly, allowing the solution to warm to 0°. (The initial reaction was vigorous and appreciable foaming occurred.) Within two minutes after the borohydride was added, an acidified portion of the solution gave no starch-iodide test, indicating absence of ozonide. An additional 3.0 g. of borohydride was added in 1 g. portions at hour intervals, and the solution was allowed to stand for a total of 35 hours. (In other runs, 18 hours was found to be sufficient for substantially complete reduction as evidenced by lack of significant absorption at 5.86μ.) Acetic acid was added slowly and with stirring until the solution had pH 5. The methanol was distilled, under reduced pressure, the last portions being co-distilled with ethyl acetate and water to insure complete removal of the alcohol. The aqueous solution was then extracted three times with ethyl acetate. The extracts were washed in turn with 5% aqueous hydrochloric acid (cold), water, aqueous sodium bicarbonate, and water. The combined ethyl acetate solutions were dried over sodium sulfate and concentrated to dryness under reduced pressure. The product was 875 mg. of an amorphous material which had no ultraviolet absorption; in the infrared there appeared a weak band at 5.87μ, possibly due to an 11-ketone. The product (630 mg.) from another run was chromatogrammed on 25 g. of Florisil, using ethyl-acetate-benzene as the eluant system (in an attempt to overcome the insolubility of the compounds in ether-benzene mixtures). No fraction could be induced to crystallize. The product of another run on Florisil using methanol-benzene as eluant again afforded no crystalline material.

In another run incomplete extraction of the aqueous solution gave only 71% of the crude product. A third extraction of a more concentrated aqueous solution gave an additional 26.4% of material which crystallized from aqueous methanol giving 330 mg. of crystalline tetrol nitrile, M.P. 132–135°. Several recrystallizations from aqueous methanol gave colorless rods (solvated with water), M.P. 137–140°. Non-aqueous solvents gave no crystals.

*Analysis.*—Calcd. for $C_{22}H_{37}O_5N$: C, 66.80; H, 9.43. Found: C, 68.36; H, 9.46. Calcd. for $C_{33}H_{37}O_5N.\frac{1}{2}H_2O$: C, 68.36; H, 9.46.

EXAMPLE XIII

*4b-Methyl-1β-(2-Formylethyl)-2β-Formyl-2-(2-Cyanoethyl)-4β7αDihydroxyperhydrophenanthrene (XIII)*

To a solution of 280 mg. of the amorphous tetrol (XI) (the crude borohydride product as obtained above) in 17 ml. of methanol at room temperature contained in a 25 ml. volumetric flask there was added 162 mg. of sodium metaperiodate in 8 ml. of water. A small amount of water was added to bring the volume to 25.0 ml. After 15 minutes, an aliquot was withdrawn and added to a measured amount of sodium arsenite solution containing sodium bicarbonate and potassium iodide. After ten minutes, the solution was titrated with standard iodine solution. This indicated that complete consumption of periodate had occurred within 15 minutes. The solution was diluted with water and extracted twice with ethyl acetate, each extract being washed in turn with sodium bicarbonate and twice with water. The extracts were combined, dried over magnesium sulfate, and concentrated to dryness under reduced pressure, yielding 265 mg. of a colorless, amorphous product; λ max 2.96 (OH; s, b), 3.04 (OH: s), 3.70 (CHO; m), 4.46 (CN; m), 5.84 (CHO; s), 8.90 (vw), 9.20 (sh), 9.50μ (s, b).

EXAMPLE XIV

*4b - Methyl - 1β - (2 - Formylethyl) - 2β - Formyl - 2 - (2-Cyanoethyl) - 4β,7α - Dihydroxyperhydrophenanthrene 1β-Methyl Acetal 2β,4β-Lactol Methyl Ether (XIIIa)*

A solution of 240 mg. of the amorphous dialdehyde (XII) (prepared as in the first cleavage experiment above) dissolved in 30 ml. of anhydrous methanol containing 20 mg. of p-toluenesulfonic acid monohydrate was allowed to stand at room temperature for 36 hours. Aqueous sodium bicarbonate was added, and the methanol was evaporated under reduced pressure. An ether extraction of the aqueous layer afforded 260 mg. of a benzene soluble oil (λ max 5.89μ (CO; mw), which was chromatogrammed on 12 g. of Florisil. The desired compound was eluted between 20% benzene in ether and ether.

In another run, after treating 940 mg. of the amorphous dialdehyde XII in 60 ml. of methanol containing 40 mg. of p-toluenesulfonic acid monohydrate for 18 hours, there was obtained 830 mg. of oil (λ max 5.70 (γ-lactone; mw), 5.89μ (CO; w) which was chromatogrammed on 30 g. of Florisil. Eluants from benzene to ether gave 400 mg. of the desired material as shown by subsequent formation of the crystalline acetate in high yield. That eluted with ethyl acetate was rechromatogrammed, but again it all came off after ether; it was then treated with methanolic acid for an additional 18 hours. Upon chromatography, an additional 165 mg. of acetal XIIIa was eluted with ether (total: 605 mg., 78.0%). The remaining material showed a strong γ-lactone band (5.70μ) in the infrared, and therefore contained the corresponding 2β,4β-lactone (XIV).

EXAMPLE XV

*4b - Methyl - 1β - (2 - Formylethyl) - 2β - Formyl - 2 - (2-Cyanoethyl) - 4β,7α - Dihydroxyperhydrophenanthrene 1β-Methyl Acetal 2β,4β-Lactol Methyl Ether 7α-Acetate (XIIIb)*

A solution of 560 mg. of the amorphous acetal XIIIa (material prepared as above and eluted from Florisil with or before ether) in 10 ml. of pyridine and 5 ml. of acetic anhydride was heated at 100° for 10 minutes. The solution was cooled and poured on iced aqueous sodium bicarbonate. The mixture was extracted with ether, the extract being washed with water, dried over magnesium sulfate, and concentrated to dryness at aspirator pressure. The pyridine was removed at 2 mm. with as little heating as possible. From a small volume of methanol, the colorless oil remaining gave a heavy precipitate of crystals which was washed with petroleum ether (B.P. 32–35°). The first crop weighed 505 mg., M.P. 123–126°. An additional crop was obtained, M.P. 118–124°. The pure material was obtained as colorless prisms, M.P. 126–127°, by several recrystallizations from methanol; λ max 4.46 (CN; m), 5.80μ (OAc; s).

*Analysis.*—Calcd. for $C_{27}H_{43}O_6N$: C, 67.89; H, 9.08; methoxyl, 19.49. Found: C, 67.88; H, 9.10; methoxyl, 19.84. The bands in the infrared from 8.8 to 9.8μ are similar to those of the hydroxy acetal recorded above, except the band at 9.62 is displaced to 9.70μ and is more intense.

EXAMPLE XVI

*4b - Methyl - 1β - (2 - Formylethyl) - 2β - Formyl - 2 - (2-Methylcarboxyethyl) - 4β,7α - Dihydroxyperhydrophenanthrene 1β-Methyl Acetal 2β,4β-Lactol Methyl Ether 7α-Acetate (XV)*

A solution of 440 mg. of the acetoxy nitrile XIIIb, M.P. 124–126°, in 30 ml. of methanol and 10 ml. of 10% aqueous potassium hydroxide was heated at reflux for 10 hours. The methanol was distilled off at reduced pressure but base insoluble material was still present. The solution was made 10% in potassium hydroxide and 40% in methanol and was heated at reflux an additional 4 hours. The methanol was distilled at atmospheric pressure, and the remaining solution was cooled and poured into a separatory funnel, using a minimum volume of water to complete the transfer. The aqueous solution was extracted with benzene, and the benzene layer was washed with water, dried over magnesium sulfate, and concentrated to dryness under reduced pressure. This provided 35 mg. of neutral material. The aqueous layer was cooled to 5° and acidified to pH 4 with iced 3 N hydrochloric acid. The solution was quickly extracted with ethyl acetate and washed three times with water. Each of the aqueous layers was washed in turn with chilled ethyl acetate. The organic layers were combined (total volume: 200 ml.) and to them was added 20 ml. of methanol followed by a solution of excess diazomethane in ether. The reaction mixture was allowed to stand at room temperature for 10 minutes. The diazomethane was blown off in a stream of air, and the organic solvent was removed in vacuo, yielding 390 mg. of a slightly yellow oil. The product was chromatogrammed on 6 g. of Florisil: benzene eluted 2 mg. of oil; ether eluted 344 mg. of the amorphous ester XV ($\lambda$ max 2.96 (OH; m), 5.80$\mu$ ($CO_2R$; s)) and, ethyl acetate gave 40 mg. of material which appear to be additional ester (infrared spectrum similar to the preceding material).

EXAMPLE XVII

4b - Methyl-1$\beta$-(2-Formylethyl) - 2$\beta$ - Formyl-2-(3,3,3-Hydroxydiphenylpropyl) - 4$\beta$,7$\alpha$ - Dihydroxyperhydrophenanthrene 1$\beta$-Methyl Acetal 2$\beta$,4$\beta$-Lactol Methyl Ether (XVIa)

To a solution of 110 mg. of the amorphous ester XV (purified by chromatography) in 20 ml. of anhydrous ether under an atmosphere of nitrogen was added an ether solution of phenyllithium prepared from 0.210 g. of lithium wire and 2.4 g. of bromobenzene following the directions given by J. C. W. Evans and C. F. H. Allen, Org. Syntheses, vol. 2, p. 22 (1943). After the solution was stirred at room temperature for 3 hours, the excess phenyllithium was decomposed by the dropwise addition of absolute ethanol. The solution was extracted with 1:1 ether-ethyl acetate, and the extract was washed with water, dried over magnesium sulfate, and concentrated to dryness in vacuo, affording 277 mg. of oil. The entire product was chromatogrammed on 7 g. of Florisil: benzene eluted 14 mg. of petroleum ether soluble material which was discarded; ether eluted 125 mg. of the diphenyl carbinol XVIa which crystallized from acetone-petroleum ether in fluffy needles: 120 mg., M.P. 100–102° (solvated; $\lambda$max 2.95 (OH; s), 5.84 (CO; s), 6.26$\mu$ ($\phi$, w). The carbonyl band supported the suggestion that acetone of solvation was present. Several recrystallizations from acetone-petroleum ether gave colorless needles, M.P. 101–103°; multiple weak maxima near 251 m$\mu$; $\lambda$min 243 m$\mu$; (cf. p. 200). Attempts to crystallize the pure material from solvents not containing acetone failed; on addition of a drop of acetone to these solvents, providing the material was sufficiently insoluble, crystals formed rapidly with melting point as above. In the absence of acetone the oil showed maxima at 2.95 (m) and 6.26$\mu$ (w). Drying of the crystalline product at 50°/0.2 mm. for 24 hours caused no decrease in the intensity of the carbonyl band in the infrared.

*Analysis.*—Calcd. for $C_{40}H_{48}O_7$: C, 73.86; H, 8.99; methoxyl, 14.31. Found: C, 74.17; H, 8.95; methoxyl, 14.23.

EXAMPLE XVIII

4b - Methyl - 1$\beta$ - (2 - Formylethyl)-2$\beta$-Formyl-2-(3,3-Diphenyl - 2 - Propenyl) - 4$\beta$,7$\alpha$ - Dihydroxyperhydrophenanthrene 1$\beta$-Methyl Acetal 2$\beta$,4$\beta$-Lactol Methyl Ether 7$\alpha$-Acetate (XVIIb)

The diphenyl carbinol XVIa (48 mg.), M.P. 100–102°, was dissolved in 1 ml. of pyridine, and to this was added 0.5 ml. of acetic anhydride. The mixture was heated at 100° for 8 minutes, cooled and poured on iced aqueous sodium bicarbonate. The organic material was extracted with ether, and the ether solution was washed with water, dried over magnesium sulfate and concentrated to dryness under reduced pressure. This yielded 50 mg. (100%) of a colorless amorphous product; $\lambda$max 2.90 (OH; m), 5.80 (OAc; s), 6.26$\mu$ ($\phi$; mw).

A solution of 75 mg. of the amorphous 3$\alpha$-acetate XVI$b$ obtained as above in 10 ml. of anhydrous benzene, 1.0 ml. of pyridine, and 0.5 ml. of thionyl chloride was allowed to stand at 0° for 15 minutes. The solution was poured on iced aqueous sodium bicarbonate and was extracted with ether. The extract was dried over magnesium sulfate and distilled to dryness under reduced pressure. The product prepared in this way from another run gave a positive Beilstein test for halogen, showed no hydroxyl band in the infrared, and had an ultraviolet spectrum similar to starting material ($\lambda$max 252 m$\mu$, log E 3.31). The product dissolved in 20 ml. of pyridine was heated at 100° for 15 minutes. The solvent was distilled under reduced pressure, and the product was taken up in 10 ml. of benzene. (In another run this material showed $\lambda$max 251, log E 4.18.) The benzene solution was poured on 5 g. of Florisil: elution with benzene gave a trace of material; ether afforded 65 mg. of oil which on dissolution in a small amount of methanol gave 54 mg. of rods, M.P. 154–158°. A second crop, M.P. 148–155°, was obtained. Recrystallization from ether yielded a solvated form which melted at 105° with evolution of gas, resolidified, and melted again at 154–156°. Several recrystallizations from methanol gave pure product XVII$b$, M.P. 159–160°, as colorless rods; $\lambda$max 250.5 (log E 4.20), $\lambda$min 236 (4.12), shoulder at 220–226 m$\mu$ (log E 4.19).

*Analysis.*—Calcd. for $C_{39}H_{52}O_6$: C, 75.94; H, 8.40. Found: C, 75.77; H, 8.48.

EXAMPLE XIX

4b-Methyl-1$\beta$-(2-Formylethyl) - 2$\beta$ - Formyl-2-(2-Cyanoethyl) - 4$\beta$,7$\alpha$-Dihydroxyperhydrophenanthrene 2$\beta$,4$\beta$-Lactol Methyl Ether 7$\alpha$-Acetate (XVIII)

The acetoxy nitrile XIII$b$ (360 mg.), M.P. 123–125°, was slurried in 3 ml. of ether. Upon the addition of 9 ml. of 70% aqueous acetic acid the crystals dissolved immediately. The solution was allowed to stand at room temperature for 16 hours and was then extracted with ether. The extract was washed thoroughly with water and aqueous sodium bicarbonate, dried over magnesium sulfate, and concentrated to dryness under reduced pressure, yielding 337 mg. of oil. On trituration with ether there was obtained 305 mg. of crystals, M.P. 83–85° (with evolution of gas). This material proved to be solvated with ether. The mother liquors afforded 15 mg. of lower melting material. Recrystallization from benzene-petroleum ether gave platelets, M.P. 85–105°; after two further recrystallizations from this solvent mixture, no improvement in melting point was found. Recrystallization from several other solvents gave only poorly defined crystals. On slow crystallization from ether, crystals, M.P. 88–97°, were obtained. Recrystallizing this material quickly from ether, colorless platelets, M.P. 84–86°, were produced. This may indicate the existence of a higher melting form which is not readily obtainable. Drying a sample, M.P. 84–86°, at room temperature and 0.2 mm. caused it to melt in a short time; it then exhibited $\lambda$max 3.70 (CHO; m), 4.47 (CN; m), 5.84$\mu$ (CHO, OAc; s); bands at 8.90, 9.17, and 9.35$\mu$ were at equal intensity (m), while that at 9.70$\mu$ was slightly stronger.

EXAMPLE XX

Selective Hydrolysis of the Phenyl Styrene Acetate (XVIIb)

The phenyl styrene acetate XVII$b$ was saponified by refluxing in aqueous methanol containing sodium carbonate for 20 minutes. The product was invariably amorphous but exhibited no carbonyl absorption in the infrared. Using 70% aqueous acetic acid at 70°, after 2 hours the product was worked up as in the preceding experiment; an infrared spectrum showed λ max 2.96 (OH; mw), 5.84 (CHO; ms), after 4 hours: λ max 2.96 (OH; m); 5.84 (CHO; mw), 6.02 (ms). After 30 minutes at room temperature a fresh sample exhibited a maximum at 5.84μ (mw); after 1 hour: 5.84 (m), 6.03μ (w); after 5 hours: 5.84 (ms), 6.05 (m). Using 70% aqueous acetic acid containing an added 20% of methanol slowed hydrolysis considerably: after 24 hours, the product showed a maximum at 5.84μ (m), but the band tapered off gradually to 6.10μ, instead of having the characteristically narrow absorption. A similar spectrum was obtained after 4 hours from the styrene alcohol XVIIa in 8 ml. of methanol containing 2 ml. of water and 40 mg. of p-toluenesulfonic acid monohydrate.

EXAMPLE XXI

*4b-Methyl - 1β - (2-Formylethyl) - 2β - Formyl - 2 - (3,3-Diphenyl - 2 - Propenyl) - 4β,7α - Dihydroxyperhydrophenanthrene 2β,4β - Lactol Methyl Ether (XIX).*

50 mg. of the amorphous styrene alcohol XVIIa (obtained by saponification of crystalline styrene acetate) in 2 ml. of ether and 15 ml. of 70% aqueous acetic acid was stirred for 6 hours at room temperature. The product was worked up as in the preceding experiment and was chromatogrammed on 8 g. of Florisil. Elution with 2% ether in benzene gave 14 mg. of fairly pure styrene aldehyde XIX; λ max 3.70 (CHO; m), 5.83μ (CHO; s); λ max 251 mμ (log E 4.01).

EXAMPLE XXII

*Enamine Degradation of the Mono-Aldehyde XVIII: 4b-Methyl - 1β - (2 - Formylmethyl) - 2β - Formyl - 2 - (2 - Cyanoethyl) - 4β,7α - Dihydroxyperhydrophenanthrene 2β,4β-Lactol Methyl Ether 7α-Acetone (XXI).*

(a) *Formation of the enamine: 4b-methyl-1β-[3-(1-piperidyl) - 2 - propenyl] - 2β - formyl - 2 - (2-cyanoethyl - 4β,7α - dihydroxyperhydrophenanthrene 2β,4β-lactol methyl ether 7α-acetate (XX).*—After standing at room temperature for 10 minutes, a solution of 710 mg. of the amorphous mono-aldehyde XVIII (the entire product from the selective hydrolysis of the acetal XIIIb) in 5 ml. of piperidine and 10 ml. of benzene was heated at brisk reflux in a nitrogen atmosphere. After 3 hours, the solvents were removed under reduced pressure, leaving 820 mg. of a colorless oil; λ max (in ether) 233 mμ (log E 3.92); λ max 5.78 (OAc; s), 6.09μ (C=C; ms), and no hydroxyl absorption. On addition of a drop of concentrated hydrochloric acid to an ethanol solution of the enamine the maximum at 233 mμ disappeared leaving only end absorption which at 230 mμ was 10% of its original value. This indicated that no appreciable cyclization had occurred and that the starting material possessed no significant amount of dialdehyde XII.

(b) *Ozonolysis of the enamine.*—Through a solution of 810 mg. of the crude enamine XX (as obtained above) in 60 ml. of methylene chloride and 1.5 ml. of pyridine at −70° was passed a stream of oxygen containing ozone until the solution turned blue (17 minutes). (The originally colorless solution turned brown and faded to colorless during the first 15 minutes.) Three grams of zinc dust and 6 ml. of glacial acetic acid were added immediately. The stirred solution was allowed to warm to 0° and to remain at that temperature for 30 minutes. The solution was filtered and washed with aqueous sodium bicarbonate. The organic solvent was dried over magnesium sulfate and was distilled below room temperature, affording 750 mg. of a benzene soluble, pale yellow oil. The product was chromatogrammed on 25 g. of Florisil. Between benzene and ether there was eluted 310 mg. (45%) of the amorphous aldehyde XXI; λ max 3.70 (CHO; m), 4.47 (CN; m), 5.79μ (OAc; s).

EXAMPLE XXIII

*4b - Methyl - 1β - (2 - Formylmethyl) - 2β - Formyl - 2 - (2 - Cyanoethyl) - 4β,7α - Dihydroxyperhydrophenanthrene 1β - Methyl Acetal 2β,4β - Lactol Methyl Ether 7α-Acetate (XXII).*

A solution of 310 mg. of the chromatographed noncrystalline noraldehyde XXI (see preceding example) in 60 ml. of anhydrous methanol containing 40 mg. of p-toluenesulfonic acid monohydrate was allowed to stand at room temperature for 9 hours. Aqueous sodium bicarbonate was added, and the methanol was evaporated under reduced pressure. The remaining mixture was extracted with ether, and the extract was dried over magnesium sulfate and concentrated to dryness in vacuo, affording 325 mg. of oil. This was chromatogrammed on 12 g. of Florisil. Petroleum ether and benzene eluted 4 mg. of oil; ether eluted 285 mg. of oil which crystallized from petroleum ether, giving 230 mg. of irregular prisms, M.P. 149–152°. A second crop had M.P. 147–151°. Recrystallization from methanol and again from ether gave a pure substance as colorless rods, M.P. 150–152°. The material as crystallized from methanol underwent a slow crystal change at 147°.

*Analysis.*—Calcd. for $C_{22}H_{41}O_6N$: C, 67.36; H, 8.91; methoxyl, 20.08. Found: C, 67.36; H, 9.00; methoxyl, 20.08.

EXAMPLE XXIV

*4b - Methyl - 1β - (2 - Formylmethyl) - 2β - Formyl - 2 - (2 - Methyl - Carboxyethyl) - 4β,7β - Dihydroxyperhydrophenanthrene 1β - Methyl Acetal 2β,4β - Lactol Methyl Ether (XXIII).*

A solution of 220 mg. of the nor-ketal XXII, M.P. 149–152°, in 5 ml. of methanol and 10 ml. of 10% aqueous potassium hydroxide was heated at reflux 17 hours. The methanol was distilled off and the remainder was extracted with chloroform. The aqueous solution was cooled to 5° and was acidified to pH 4 with cold 3 N hydrochloric acid. The solution was rapidly extracted twice with cold ethyl acetate, each extract being washed in turn three times with water. To the combined extracts (ca. 300 ml.) was added 10 ml. of methanol followed by a solution of excess diazomethane in 50 ml. of ether. After 10 minutes, the diazomethane was blown off, and the solvent was evaporated under reduced pressure, affording 235 mg. of an oil. Chromatography of this material on 6 g. of Florisil gave only traces of material with petroleum ether and benzene as eluants. Elution in the ether gave 220 mg. of XXIII which could not be induced to crystallize.

EXAMPLE XXV

*4b - Methyl - 1β - (2 - Formylmethyl) - 2β - Formyl - 2- (3,3,3 - Hydroxydiphenylpropyl) - 4β,7α - Dihydroxyperhydrophenanthrene 1β-Methyl Acetal 2β, 4β-Lactol Methyl Ether (XXIVa)*

Excess phenyllithium (ca. 50 equivalents prepared as in Example XVII) in 20 ml. of ether was added to 215 mg. of the amorphous ester XXIII (prepared in the preceding example) in 20 ml. of anhydrous ether under an atmosphere of nitrogen. After the solution was stirred at room temperature for 2 hours, the excess reagent was decomposed by the dropwise addition of ethanol. Water was added, and the mixture was extracted with ether. The extract was washed with water, dried over magnesium sulfate, and concentrated to dryness under reduced pressure, yielding 310 mg. of an oil which was chromatogrammed on 6 g. of Florisil. With petroleum ether and with benzene 19 mg. of petroleum ether soluble material was eluted and was discarded; ether eluted 267 mg. of an oil which crystallized on trituration with a small volume of ether, giving 252 mg. of needles, M.P. 116–119°. The product was soluble in ether; it crystallized very poorly from any solvent containing petroleum ether or water. The best sample obtained was from ether, M.P. 116–118°, as fine needles; λ max 252 (log E 2.73), 258 (2.77), 264 (2.64), 268 (sh), 248 (sh); λ min 243 mμ (2.64), 255 (2.70).

*Analysis.*—Calcd. for $C_{36}H_{50}O_6$: C, 74.70; H, 8.71. Found: C, 74.71; H, 8.78.

EXAMPLE XXVI

*Selective Acetylation of XXIVa*

A solution of 250 mg. of the diphenyl carbinol XXIVa, M.P. 116–119°, in 10 ml. of pyridine and 5 ml. of acetic anhydride was heated at 100° for 10 minutes. The solution was cooled and poured onto iced aqueous sodium bicarbonate. The mixture was extracted with ether, dried over magnesium sulfate, and concentrated to dryness under reduced pressure, affording 255 mg. (95.2%) of the colorless, amorphous 7α-monoacetate XXIVb; λ max 2.93 (OH; m), 5.81 (OAc; s), 6.26μ (φ; mw).

EXAMPLE XXVII

*4b - Methyl - 1β - (2 - Formylmethyl) - 2β - Formyl - 2-(3,3 - Diphenyl - 2 - Propenyl) - 4β,7α - Dihydroxyperhydrophenanthrene 1β - Methyl Acetal 2β, 4β - Lactol Methyl Ether 7α-Acetate (XXV)*

To a solution of 250 mg. of the amorphous monoacetate XXIVb (prepared as above) in 10 ml. of benzene and 1.0 ml. of pyridine at 0° was added 0.5 ml. of thionyl chloride. After standing at 0° for 15 minutes, the solution was poured onto iced sodium bicarbonate, and the resulting mixture was extracted with ether. The extract was dried over magnesium sulfate, and the ether was removed under reduced pressure. Pyridine (20 ml.) was added and the solution was heated at 100° for 20 minutes. The solution was then concentrated to dryness under reduced pressure and the residue was dissolved in a small volume of benzene. The benzene solution was poured on 6 g. of Florisil: elution with petroleum ether and with benzene gave only traces of material. Ether provided 230 mg. of a colorless amorphous product; λ max 251 (log E 4.24); λ min 235 mμ (4.17).

EXAMPLE XXVIII

*4b - Methyl - 1β,2α - Bis(2 - Formylmethyl) - 2β - Formyl - 4β,7α - Dihydroxyperhydrophenanthrene 1β-Methyl Acetal 2β,4β-Lactol Methyl Ether 7α-Acetate (XXVI)*

Through a solution of 225 mg. of the amorphous phenyl styrene XXV (see preceding example) in 30 ml. of methylene dichloride and 0.15 ml. of pyridine at −70° was passed a stream of oxygen containing ozone. When the solution turned a faint blue color, 3 g. of zinc dust and 6 ml. of glacial acetic acid were added immediately. The solution was stirred at 0° until it gave a negative starch-iodide test (10 minutes); the mixture was filtered, washing the zinc with additional methylene dichloride. The organic solution was washed with aqueous sodium bicarbonate, dried over magnesium sulfate, and concentrated to dryness in vacuo, giving 230 mg. of oil. This was chromatogrammed on 5 g. of Florisil. Benzene eluted 60 mg. of a low melting solid (presumably benzophenone because of its volatility, solubility in petroleum ether, and spectrum; λ max 253 mμ, log E 4.02). Ether gave 110 mg. of the mono-aldehyde XXVI; λ max 3.70 (CHO; w), 5.82 OAc, CHO; s), 6.26μ (φ, mw); λ max 242 (log E 2.93).

EXAMPLE XXIX

*4b - Methyl - 1β,2α - Bis(2 - Formylmethyl) - 2β - Formyl-4β,7α-Dihydroxyperhydrophenanthrene 2β,4β - Lactol 7α-Acetate (XXVII)*

In 1 ml. of ether was dissolved 20 mg. of the crude acetal aldehyde XXVI (as obtained in the above example, after the first chromatography). To this was added 3 ml. of 70% aqueous acetic acid, and the homogeneous solution was allowed to stand at room temperature for 10 hours. The material was extracted with ether, and the extract was washed with aqueous sodium bicarbonate, dried over magnesium sulfate, and concentrated under reduced pressure, yielding 15 mg. of XXVII; λ max 2.90 (OH; m), 3.70 (CHO; mw), 5.82 (OAc, CHO; s), 6.26μ (φ, mw), the ketal bands near 9μ were very indistinct; a shoulder appeared at 240 mμ (log E 3.26).

EXAMPLE XXX

*3α-Acetoxy-17-Formyl-16-Etiocholen-11β-Ol-18-one 11β,18-Lactol (XXVIII)*

A benzene solution (5 ml.) of 15 mg. of the hydrolyzed material produced above (XXVII) containing 3.4 mg. of piperidine and 6.2 mg. of acetic acid was heated at 60° in a slow stream of nitrogen with an azeotropic separator. After 1 hour, half the solution was withdrawn, diluted with benzene, and washed with dilute aqueous hydrochloric acid and with aqueous sodium bicarbonate. The benzene extract was dried over magnesium sulfate and concentrated to dryness under reduced pressure, giving a colorless oil (XXVIII); λ max 239 (log E 3.58), λ min 226 mμ (log E 3.56); after 5 hours, the same work up afforded material with a similar ultraviolet spectrum and with the following infrared absorption: 2.90 (OH; m), 3.70 (CHO; m), 5.81 (OAc, CHO; s, b), 6.06 (sh), 6.26 (φ; mw). The material was recombined in 5 ml. of benzene containing 3.4 mg. of piperidine and 6.2 mg. of acetic acid. The solution was heated at reflux under nitrogen for 5 hours and then worked up as above. The ultraviolet spectrum of the product showed only a shoulder at 240 mμ (log E 3.26).

The monoaldehyde XVIII was oxidized to the corresponding carboxylic acid by use of the chromium trioxide-pyridine complex. The carboxylic acid (XXIX) was not isolated because of its anticipated internal instability (due to the acid sensitivity of the lactol ether group present). The nitrile function was hydrolyzed directly with strong base, and the resulting diacid (XXX) was immediately esterified with diazomethane in the presence of methanol. Chromatography of the product followed by spectral analysis of the purified material indicated the overall yield from the monoaldehyde XVIII to the diester XXXI to be 65%. The diester XXXI was treated with excess phenyllithium, and the resulting bis-diphenylcarbinol (XXXII) was selectively acetylated at C₃, and then dehydrated to the diolefin (XXXIII acetate). Ozone was passed into a solution of the unsaturated compound (XXXIII acetate) at −70° in methylene chloride containing pyridine, until a pale blue color developed. The ozonide was then decomposed with zinc and acetic acid at 0° and the di-aldehyde (XXXIV acetate) was treated under cyclization conditions. Chromatography of the product on Florisil gave the crystalline aldehyde (XXXV acetate).

EXAMPLE XXXI

*4b-Methyl - 1β,2α-Di - (Ethylcarbomethoxy) - 2β-Formyl-4β,7α - Dihydroxyperhydrophenanthrene 2β,4β - Lactol Methy Ether 7α-Acetate (XXXI)*

A solution of 62 mg. (0.144 millimole) of 4b-methyl-1β-formylethyl-2β-formyl-2α - (2-cyanoethyl) - 4β,7β-dihydroxyperhydrophenanthrene 2β,4β-lactol methyl ether 7α-acetate (XVIII), M.P. 83–85°, in 2 ml. of pyridine was added to 4 ml. of pyridine containing 400 mg. of chromium trioxide. After 18 hours the solution was diluted with water and was brought to pH 4 with dilute hydrochloric acid. The mixture was then extracted twice with 1:1 ether-ethyl acetate, and the extracts were washed three times with water. Concentration of the organic solution gave 65 mg. of an ether soluble, colorless oil, 4b-methyl-1β-ethylcarboxy - 2β-formyl-2-(2-cyanoethyl)-4β, 7α-dihydroxyperhydrophenanthrene 2β,4β-lactol methyl ether 7α-acetate (XXIX).

The basic aqueous solution from above was made 10% in potassium hydroxide by the addition of solid alkali. After heating the solution on the steam bath for 21 hours, it was cooled and was 90% neutralized by the slow addition of iced 6 N hydrochloric acid. The volume of the solution was reduced to roughly 60 ml., and the remainder was cooled and acidified to pH 4 with iced hydrochloric acid. The solution was immediately extracted twice with ethyl acetate, each extract being washed in turn three times with water. To the combined extracts containing the dicarboxylic acid (XXX) was added 15 ml. of methanol followed by an ethereal solution of excess diazomethane. After 10 minutes at room temperature the diazomethane was blown off in a stream of air. The remaining solution was concentrated to dryness under reduced pressure and the residue was chromatogrammed on 6 g. of Florisil. Nothing was eluted with benzene or ether; ethyl acetate provided 44 mg. of an ether soluble oil, the diester XXXI; strong absorption from 5.78–5.90$\mu$.

EXAMPLE XXXII

*4b-Methyl - 1β,α2 - Di - (3,3,3-Hydroxydiphenylpropyl)-2β-Formyl-4β,7β-Dihydroxyperhydrophenanthrene 2β, 4β-Lactol Methyl Ether (XXXII)*

A solution of 35 mg. (0.077 millimole) of the chromatographed diester XXXI in 5 ml. of ether was added to a stirred solution of ca. 30 millimoles of phenyllithium in ether. After 2 hours the excess reagent was decomposed by dropwise addition of absolute ethanol. The solution was diluted with water and extracted with ether. Chromatography on 6 g. of Florisil afforded 50 mg. of a colorless oil eluted after benzene and with ether. This was the desired tetraphenyl triol XXXII; multiple weak peaks from 240–260, the most distinct being at 248 m$\mu$, log E 3.29; 2.98 (OH; b,s), 6.26 ($\phi$; mw) $\mu$.

EXAMPLE XXXIII

*4b - Methyl - 1β,2α - Di - (3,3-Diphenylprop-2-enyl) - 2β-Formyl-4β,7β-Dihydroxyperhydrophenanthrene 2β,4β-Lactol Methyl Ether 7α-Acetate (XXXIII Acetate)*

(a) *Acetylation.*—A solution of 50 mg. of the chromatographed triol XXXII as prepared above in 10 ml. of pyridine and 5 ml. of acetic anhydride was heated at 100° for 7 minutes. The solution was cooled and poured on iced sodium bicarbonate. The mixture was then extracted with ether, and the ether solution was washed with water, dried over magnesium sulfate, and concentrated to dryness under reduced pressure, yielding 50 mg. (94%) of a colorless oil, the desired monoacetate: $\lambda$ max. 2.90 (OH; m), 5.82 (OAc; s), 6.27 ($\phi$; m) $\mu$.

(b) *Dehydration.*—To a solution of 590 mg. (0.843 millimole) of the amorphous monoacetate in 20 ml. of benzene and 4.0 ml. of pyridine at 0° was added 2.0 ml. of thionyl chloride. After 30 minutes at 0°, the solution was poured onto iced sodium bicarbonate and was extracted with ether. The washed and dried extract was concentrated to a small volume under reduced pressure. Pyridine (30 ml.) was added and the solution was heated at 100° for 25 minutes. The pyridine was distilled under reduced pressure and the residue was dissolved in benzene and poured on 20 g. of Florisil. Elution with benzene gave 75 mg. (13.4%) of a colorless oil: $\lambda$ max 250 m$\mu$ (log E 4.34); $\lambda$ min 235 (log E 4.29). Elution with ether gave 425 mg. (75.7%) of a colorless oil, $\lambda$ max 248 (log E 4.47), $\lambda$ min 235 (log E 4.41) m$\mu$. The product (XXXIII acetate) crystallized from light petroleum ether and had the M.P. 175–179°.

EXAMPLE XXXIV

*3α-Acetoxy-17-Formyl-16-Etiocholen-11β-Ol-18-One 11β,18-Lactol Methyl Ether (XXXV Acetate)*

The crystalline bis-styrene (XXXIII acetate) (104 mgms.; M.P. 173–177°) was dissolved in methylene chloride (40 ccs., B.P. 38.5°) and pyridine (0.2 ccs.); the solution was cooled to —70° and a stream of ozone-enriched oxygen (0.4 unit/minute; 110 v.) charged through the mixture (employing a Welsbach ozoniser). When the solution was a very pale blue the ozone flow was interrupted. Zinc dust (3 gm.) was added and acetic acid (6 ccs.) and the solution allowed to stir at 0° for ¼ hour. Further zinc (1 g.) and acetic acid (3 ccs.) were then added, and the solution allowed to stir at 0° for a further ¾ hour. The excess zinc was removed by filtration thru supercel. The organic solution was then washed twice with 1 cc. cold water, twice with ice cold saturated aqueous potassium bicarbonate solution, and again with ice cold water. The extract was dried over sodium sulphate and most of the solvent removed under nitrogen to give the crude di-aldehyde (XXXIV acetate). This immediately dissolved in dry benzene (30 ccs.) and cyclised by the Woodward procedure [J. Am. Chem. Soc. 74, 4223 (1952)], employing acetic acid (3 drops) and piperidine (2 drops). The product was isolated by diluting with ether and washing with ice cold 5% hydrochloric acid, water, saturated aqueous potassium bicarbonate solution, water and finally drying over sodium sulphate. Removal of the solvent gave the crude unsaturated aldehyde (XXXV acetate) (108 mgms.). This was dissolved in 20% benzene-light petroleum and chromatographed on Florisil (10 gm.) made up in the same solvent. The following fractions were collected:

| Number | Solvent | Vol/fraction, ccs. | Properties |
|---|---|---|---|
| 1–6 | 20% benzene to benzene-light petroleum. | 200 | oils, $\lambda$ $_{max}^{EtOH}$ 250 m$\mu$. |
| 7–10 | 2% ether-benzene to 1% ether benzene. | 200 | oils. |
| 11–15 | 20% ether benzene to ether. | 200 | Semi-crystalline, $\lambda$ $_{max}^{EtOH}$ 237 m$\mu$. |
| 16–22 | Ether to methanol | 200 | Non-crystalline. |

Fractions 11–15 were combined and crystallized on the addition of ether. The crystals were washed twice with ether: light petroleum (1:2) to give the unsaturated aldehyde (XXXV acetate), M.P. 182–186°.

In the above examples the ultraviolet spectra were determined in 95% ethanol solution using a Cary Recording Spectrophotometer (Model 11 MS). Infrared spectra were determined using a Baird Double Beam Infrared Recording Spectrophotometer, Model B. Crystalline samples were determined as mulls and amorphous samples were determined as solid films unless otherwise specified. The infrared maxima are accompanied by an interpretation of the absorption followed by its intensity. The following abbreviations are used with respect to these maxima: w—weak, m—medium, s—strong, v—very, sh—shoulder, b—broad. All temperatures are in ° C.

In the formulas below the R and R' in addition to hydrogen also represent hydrocarbon carboxylic acyl radicals having from one to about eight carbon atoms. Thus, the compounds can be utilized in the free alcohol form or in the form of esters derived from carboxylic acids of relatively low molecular weight. The nature of the acyloxy groups is not critical, but preferred types are those derived from lower aliphatic carboxylic acids, monocycloaliphatic carboxylic acids and monocarbocyclic aromatic acids. Illustrative of such preferred types of acyl groups are lower-alkanoyloxy groups; e.g. formyloxy, acetoxy, propionoxy, butyroxy, isobutyroxy, vareryloxy, trimethylacetoxy, caproyloxy, isocaproyloxy, heptanoyloxy, octanoyloxy, and the like; carboxyl-lower-alkanoyloxy groups; e.g. hemi-succinyloxy, hemi-glutaryloxy, hemi-idipyloxy, and the like; and monocarbocyclic aroyloxy groups; e.g. benzoyloxy, p-toluyloxy, p-nitrobenzoyloxy, 3,5-dinitrobenzoyloxy, and the like. The acyloxy groups can contain substituents such as nitro, methoxy, halogen, etc. which are inert to the reaction conditions used for the preparation of the esters. The hydrogen (H) of the hydroxyl (OH) group in compound XXVIII can be replaced by a methyl group as illustrated by compound XXXV and also by other lower alkyl (R″) groups such as ethyl, propyl, butyl, amyl, hexyl, etc. In Formula XVII, the "φ" represents the phenyl ($C_6H_5$) group.

3α-acetoxy-17-formyl-16-eticholen-11β-ol-18-one 11β,18-lactol (XXVIII) can be converted to aldosterone by conventional methods as follows. The unsaturated aldehyde (XXVIII) is hydrogenated in the presence of palladium catalyst to saturate the 6,17-double bond, and the aldehyde and lactol groups of the resulting saturated aldehyde are oxidized by treatment with chromic oxide in pyridine to give the lactone acid of Formula XXXVI. The side chain of the latter is elaborated in the same manner as has been done in the preparation of desoxycorticosterone. [Fieser and Fieser, Natural Proucts Related to Phenanthrene, 3rd edition (1949), Reinhold Publishing Corp., page 439] by making the acid chloride of XXXVI, treating the latter with diazomethane to give the diazoketone (XXXVII), and then saponifying the acetoxy group at the 3-position and reacting the diazoketone with acetic acid to give the compound of Formula XXXVIII with the desired acetoxymethyl side chain. The 3-keto-Δ⁴ system is introduced by conventional methods (Fieser and Fieser, pages 262, 451), that is, by oxidation of the 3-hydroxy group to a 3-keto group with chromic oxide, bromination at the 4-position, and finally dehydrobromination with dinitrophenylhydrazine or with lithium chloride in dimethylformamide to give the compound of Formula XXXIX. XXXIX has been converted to aldosterone by Schmidlin, Anner, Billeter and Wettstein, Experimentia, XI, 365 (1955).

Alternatively, 17-formyl-16-etiocholene-3α,11β-diol-18-one 11β,18-lactol methyl ether (XXXV) can be converted to aldosterone by conventional methods as follows. The unsaturated aldehyde (XXXV) is hydrogenated in the presence of palladium catalyst to saturate the 16,17-double bond, and the resulting saturated aldehyde is treated with methylmagnesium bromide in a conventional Grignard reaction to give the compound of Formula XL having the 1-hydroxyethyl side chain. The hydroxy groups of Compound XL are then oxidized with chromic oxide in pyridine and the lactol methyl ether hydrolyzed by heating with 70% acetic acid on a steam bath to give the lactol diketone of Formula XLI. The lactol (XLI) is then oxidized with chromic oxide in pyridine to the corresponding lactone (XLII), and a double bond in the 4-position introduced by the conventional bromination-dehydrobromination procedure described above to yield the compound of Formula XLIII which has previously been converted to aldosterone by Simpson, Tait, Wettstein, Neher, von Euw, Schindler and Reichstein, Helv. Chim. Acta, 37, 1163, 1200 (1954).

The following formulas illustrate structures of the compounds and various reactions taking place as described above.

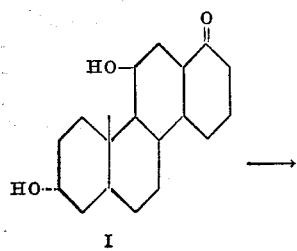

I

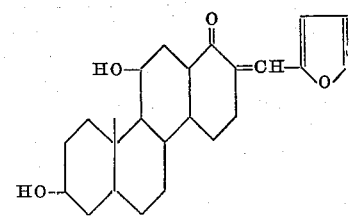

II

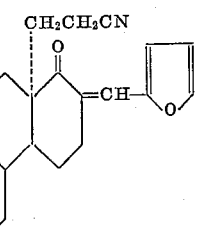

III  a. R, R′=H
     b. R=acetyl(Ac) R′=H
     c. R, R′=Ac

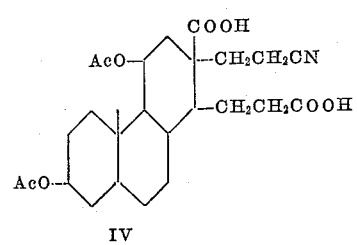

IV

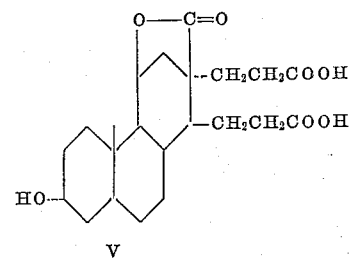

V

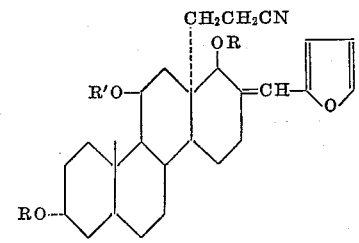

VI  a. R, R′=Ac
    b. R, R′=H
    c. R=Ac, R′=H

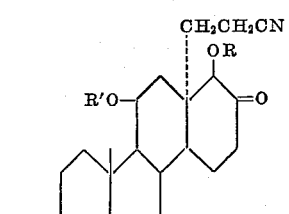

VII  a. R, R′=H
     b. R, R′=Ac

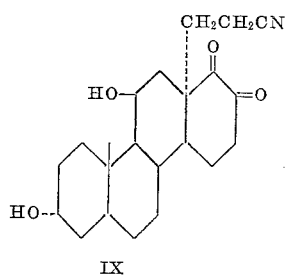
IX
X=IX-17-methyl enolate
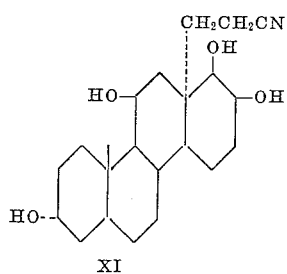
XI
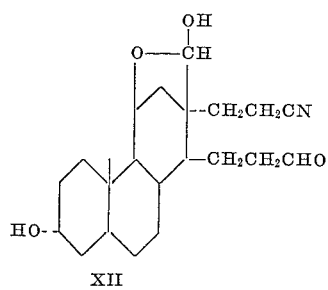
XII
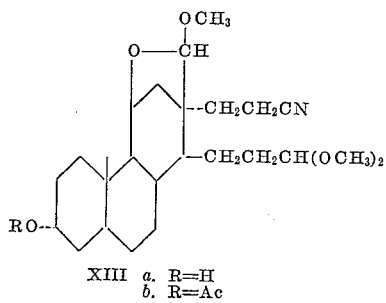
XIII  a. R=H
b. R=Ac
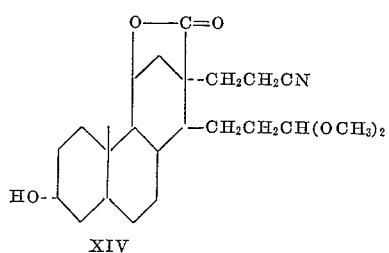
XIV
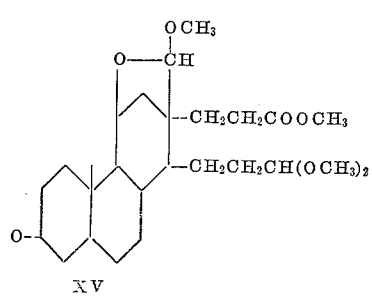
XV
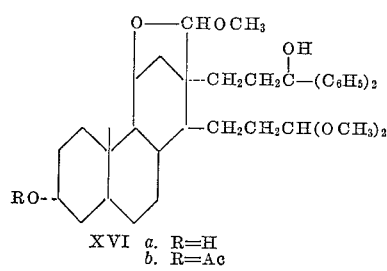
XVI  a. R=H
b. R=Ac
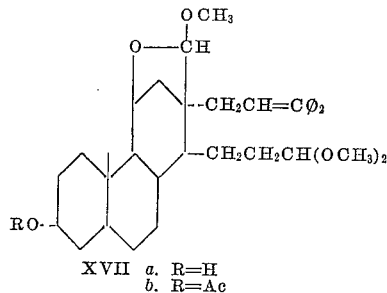
XVII  a. R=H
b. R=Ac
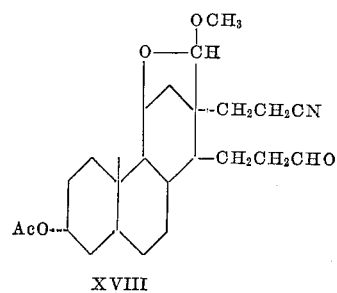
XVIII
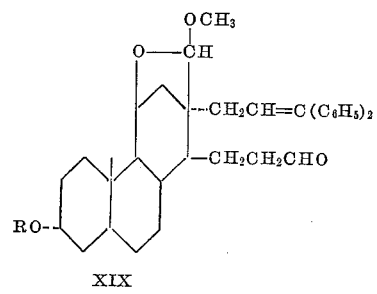
XIX
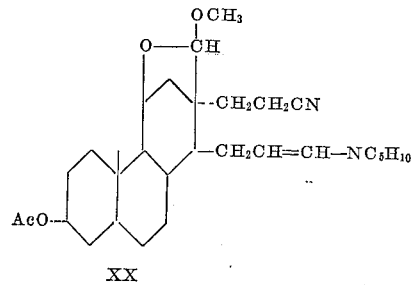
XX
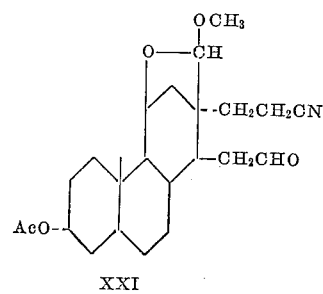
XXI

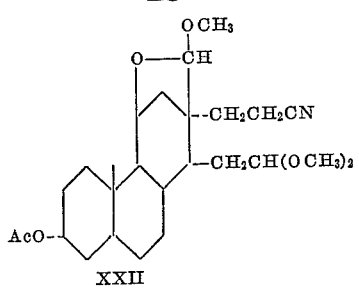
XXII
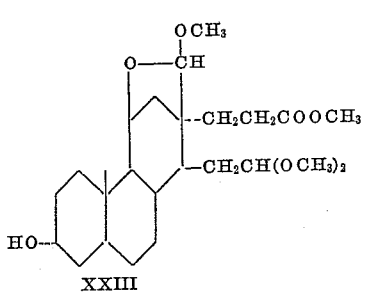
XXIII
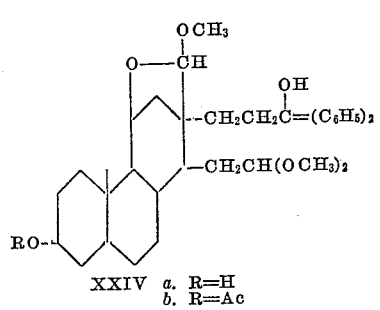
XXIV  a. R=H
b. R=Ac
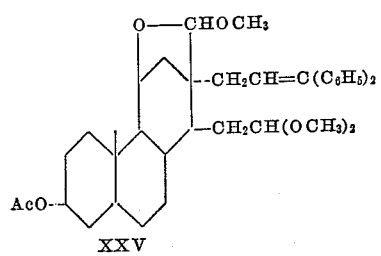
XXV
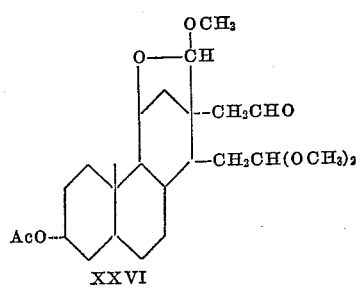
XXVI
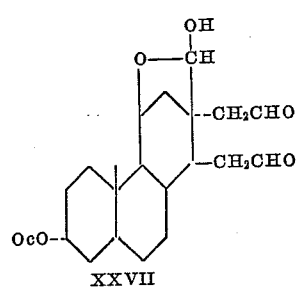
XXVII
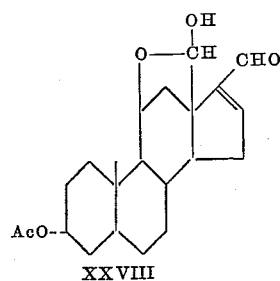
XXVIII
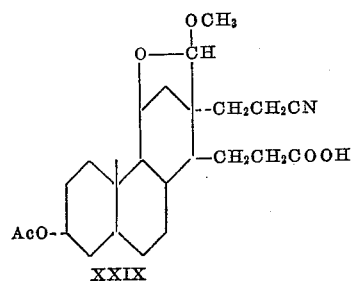
XXIX
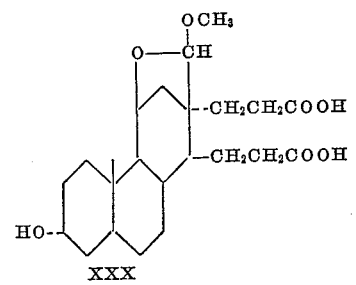
XXX
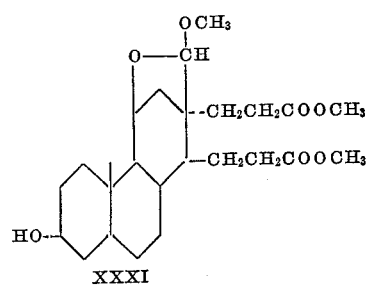
XXXI
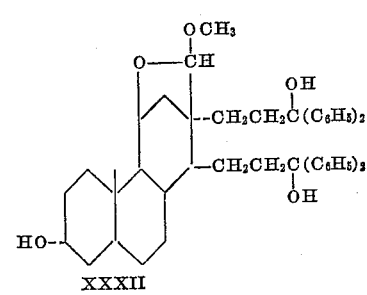
XXXII
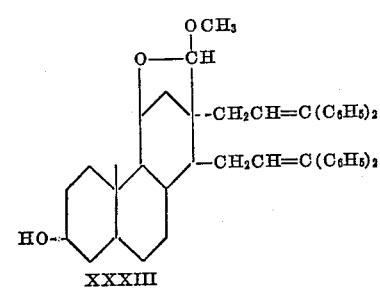
XXXIII

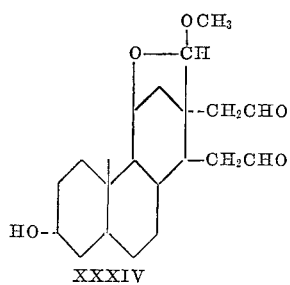

XXXIV

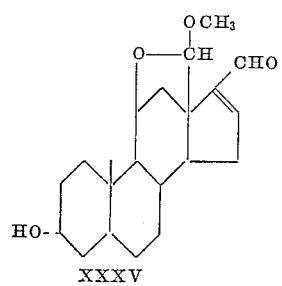

XXXV

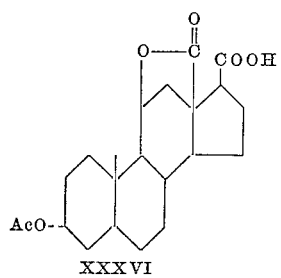

XXXVI

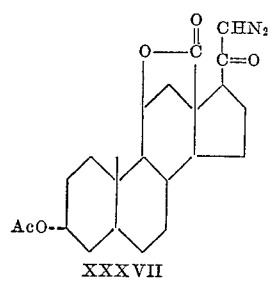

XXXVII

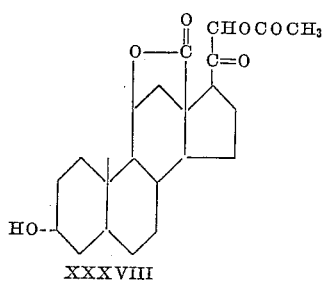

XXXVIII

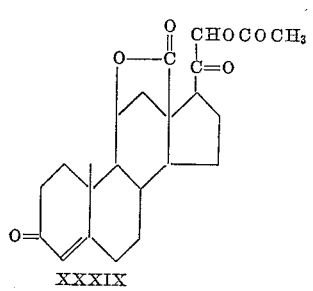

XXXIX

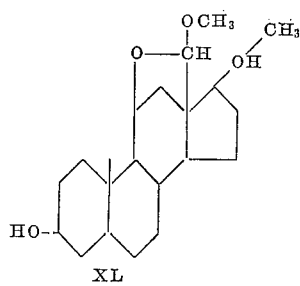

XL

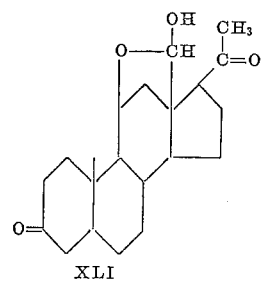

XLI

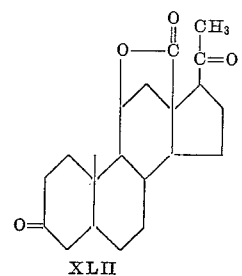

XLII

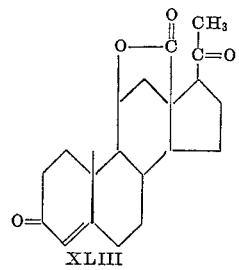

XLIII

We claim.
1. A compound having the formula

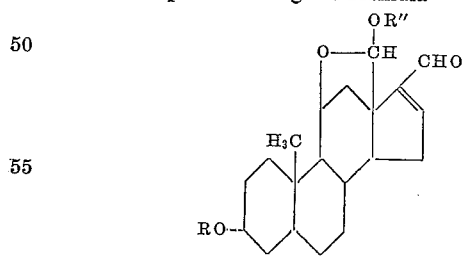

wherein R is selected from the group consisting of hydrogen and hydrocarbon carboxylic acyl radicals having from one to about eight carbon atoms, and R" is selected from the group consisting of hydrogen and loweralkyl radicals.

2. The process for preparing a compound having the formula

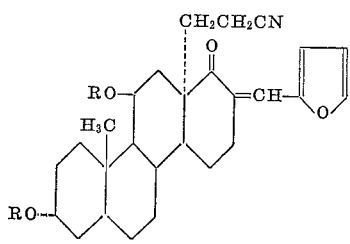

wherein R is a member of the group consisting of hydrogen and hydrocarbon carboxylic acyl radicals having from one to about eight carbon atoms, which comprises treating a compound having the formula

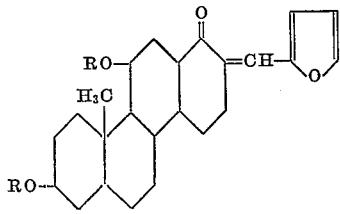

with a member of the group consisting of acrylonitrile and β-methoxypropionitrile in the presence of a strong base under anhydrous conditions.

3. The process for preparing a compound having the formula

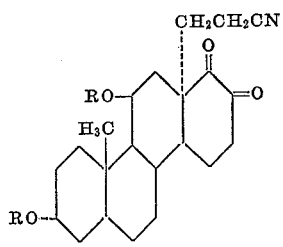

wherein R is a member of the group consisting of hydrogen and hydrocarbon carboxylic acyl radicals having from one to about eight carbon atoms, which comprises treating a compound having the formula

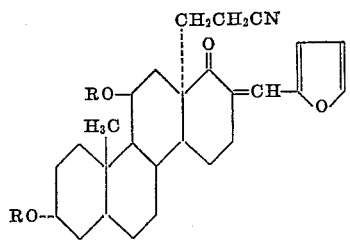

with ozone.

4. The process for preparing a compound having the formula

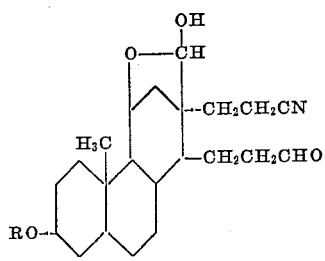

wherein R is a member of the group consisting of hydrogen and hydrocarbon carboxylic acyl radicals having from one to about eight carbon atoms, which comprises treating a compound having the formula

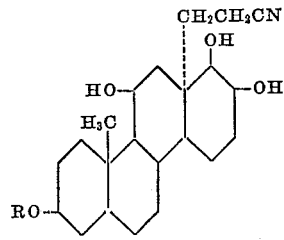

with aqueous periodate solution.

5. The process for preparing a compound having the formula

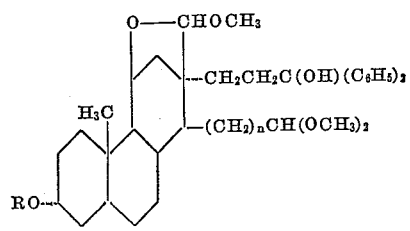

wherein R is a member of the group consisting of hydrogen and hydrocarbon carboxylic acyl radicals having from one to about eight carbon atoms, and $n$ is an integer from 1 to 2 which comprises reacting a compound having the formula

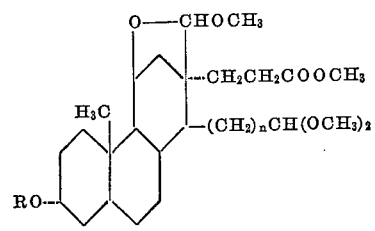

with phenyllithium.

6. The process for the preparation of a compound having the formula

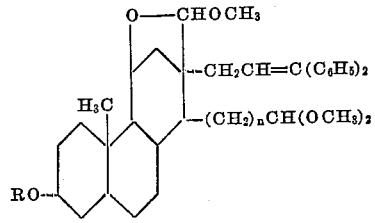

wherein R is selected from the group consisting of hydrogen and hydrocarbon carboxylic acyl radicals having from one to about eight carbon atoms and $n$ is an integer from 1 to 2, which comprises heating a compound having the formula

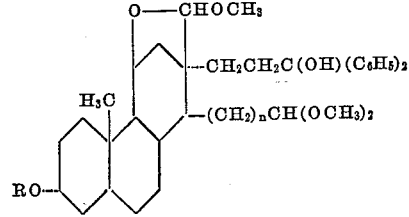

with thionyl chloride and pyridine.

7. 3α,11β,17,17a - tetrahydroxy - 13α - (2 - cyanoethyl) - D - homo - 18 - noretiocholane.

8. 4b - methyl - 1β - (2 - formylethyl) - 2β - formyl- 2 - (2 - cyanoethyl) - 4β,7α - dihydroxyperhydrophenanthrene.

9. 3α - acetoxy - 17 - formyl - 16 - etiocholen - 11β - ol- 18 - one 11β,18 - lactol.

10. 3α - acetoxy - 17 - formyl - 16 - etiocholen - 11β- ol - 18 - one 11β,18 - lactol methyl ether.

11. A compound having the formula

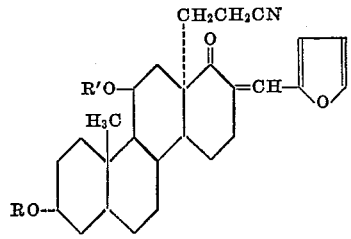

wherein R and R' are selected from the group consisting of hydrogen and hydrocarbon carboxylic acyl radicals having from one to about eight carbon atoms.

12. A compound selected from the group consisting of 4b - methyl - 1β - (2 - formylethyl) - 2β - formyl - 2 - (2 - cyanoethyl) - 4β,7α - dihydroxyperhydrophenanthrene 1β - methyl acetal 2β,4β - lactol lower - alkyl ethers and 7α - acylates thereof in which the acyl radicals are hydrocarbon carboxylic acyl radicals having from one to about eight carbon atoms.

13. A 4b - methyl - 1β - (2 - formylethyl) - 2β - formyl - 2 - (2 - cyanoethyl) - 4β,7α - dihydroxyperhydrophenanthrene 2β,4β - lactol lower - alkyl ether 7α - acylate in which the acyl radical is a hydrocarbon carboxylic acyl radical having from one to about eight carbon atoms.

14. A 4b - methyl - 1β - [3 - (1 - piperidyl) - 2 - propenyl] - 2β - formyl - 2 - (2 - cyanomethyl) - 4β,7α-dihydroxyperhydrophenanthrene 2β,4β - lactol lower-alkyl ether 7α - acylate in which the acyl radical is a hydrocarbon carboxylic acyl radical having from one to about eight carbon atoms.

15. A 4b - methyl - 1β - (2 - formylmethyl) - 2β - formyl - 2 - (2 - cyanoethyl) - 4β,7α - dihydroxyperhydrophenanthrene 2β,4β - lactol lower - alkyl ether 7α - acylate in which the acyl radical is a hydrocarbon carboxylic acyl radical having from one to about eight carbon atoms.

16. A 4b - methyl - 1β - (2 - formylmethyl) - 2β - formyl - 2 - (2 - cyanoethyl) - 4β,7α - dihydroxyperhydrophenanthrene 1β - methyl acetal 2β,4β - lactol lower-alkyl ether 7α - acylate in which the acyl radical is a hydrocarbon carboxylic acyl radical having from one to about eight carbon atoms.

17. A 4b - methyl - 1β - (2 - formylmethyl) - 2β - formyl - 2 - (2 - carbomethoxyethyl) - 4β,7β - dihydroxyperhydrophenanthrene 1β - methyl acetal 2β,4β - lactol lower-alkyl ether.

18. A compound selected from the group consisting of 4b - methyl - 1β - (2 - formylmethyl) - 2β - formyl-2 - (3,3,3 - hydroxydiphenylpropyl) - 4β,7α - dihydroxyperhydrophenanthrene 1β - methyl acetal 2β,4β - lactol lower-alkyl ethers and 7α - acylates thereof in which the acyl radicals are hydrocarbon carboxylic acyl radicals having from one to about eight carbon atoms.

19. A 4b - methyl - 1β - (2 - formylmethyl) - 2β - formyl - 2 - (3,3 - diphenyl - 2 - propenyl) - 4β,7α - dihydroxyperhydrophenanthrene 1β - methyl acetal 2β,4β - lactol lower-alkyl ether 7α - acylate in which the acyl radical is a hydrocarbon carboxylic acyl radical having from one to about eight carbon atoms.

20. A 4b - methyl - 1β,2α - bis(2 - formylmethyl) - 2β - formyl - 4β,7α - dihydroxyperhydrophenanthrene 1β-methyl acetal 2β,4β - lactol lower-alkyl ether 7α - acylate in which the acyl radical is a hydrocarbon carboxylic acyl radical having from one to about eight carbon atoms.

21. A 4b - methyl - 1β,2α - bis(2 - formylmethyl) - 2β - formyl - 4β,7α - dihydroxyperhydrophenanthrene 2β,4β-lactol 7α - acylate in which the acyl radical is a hydrocarbon carboxylic acyl radical having from one to about eight carbon atoms.

22. A compound selected from the group consisting of 4b - methyl - 1β,2α - di - (carboxyethyl) - 2β - formyl-4β,7α - dihydroxyperhydrophenanthrene 2β,4β - lactol lower-alkyl ethers and the dimethyl esters thereof.

23. A 4b - methyl - 1β,2α - di - (3,3,3 - hydroxydiphenylpropyl) - 2β - formyl - 4β,7β - dihydroxyperhydrophenanthrene 2β,4β - lactol lower-alkyl ether.

24. A 4b - methyl - 1β,2α - di - (3,3 - diphenylprop - 2-enyl) - 2β - formyl - 4β,7β - dihydroxyperhydrophenanthrene 2β,4β - lactol lower-alkyl ether 7α - acylate in which the acyl radical is a hydrocarbon carboxylic acyl radical having from one to about eight carbon atoms.

25. A 4b - methyl -1β,2α - di - (formylmethyl) - 2β-formyl - 4β,7β - dihydroxyperhydrophenanthrene 2β,4β-lactol lower-alkyl ether 7α - acylate in which the acyl radical is a hydrocarbon carboxylic acyl radical having from one to about eight carbon atoms.

No references cited.